United States Patent [19]

Barthel

[11] 3,998,071
[45] Dec. 21, 1976

[54] GREENHOUSE AIR-COOLING APPARATUS

[76] Inventor: Gerhard Barthel, 14657 Juliana St., East Detroit, Mich. 48021

[22] Filed: Dec. 31, 1975

[21] Appl. No.: 645,802

[52] U.S. Cl. .................................. 62/430; 165/18
[51] Int. Cl.² ........................................ F25D 11/00
[58] Field of Search ............... 165/18; 62/330, 430, 62/435, 438

[56] References Cited
UNITED STATES PATENTS

| | | | |
|---|---|---|---|
| 1,580,455 | 4/1926 | Swan | 62/430 |
| 3,156,101 | 11/1964 | McGuffey | 62/430 |
| 3,450,194 | 6/1969 | Barthel | 165/18 |

*Primary Examiner*—Lloyd L. King
*Attorney, Agent, or Firm*—Willis Bugbee

[57] ABSTRACT

An above-ground insulated tank adapted to be filled with water has a hollow upper wall with air ducts from which a first set of flexible air discharge pipes extends downward a short distance. Disposed near the bottom wall of the tank is a second set of perforated air discharge pipes of cruciform shape permitting air to bubble upward therefrom. A third set of unperforated flat-spirally-coiled air pipes is disposed beneath the second set and rests on the bottom of the tank and is composed of copper for high heat conductivity. Rising from the top wall of the tank and communicating therewith is an air inlet stack and an air outlet stack disposed side-by-side above, and in communication with, an air control housing containing three air chambers and provided with multiple motor-driven air blowers. Dampers or flap valves control the directional flow of air into and out of the tank depending upon whether the air is being blown into the tank in the wintertime to freeze water to ice or out of the tank through the coil pipes in the summertime to cool the greenhouse atmosphere. Suitable temperature-responsive switches control the operation of the blower motors so as to maintain the greenhouse atmosphere at a suitable temperature. A portable air compressor is adapted to be connected to the cruciform second set of perforated pipes to additionally force cold air therethrough to freeze the water in the wintertime.

10 Claims, 4 Drawing Figures

GREENHOUSE AIR-COOLING APPARATUS

GREENHOUSE COOLING PROBLEM

The problem faced by the present inventor was to maintain the atmosphere of a greenhouse at a temperature lower than 90° in the summertime because greenhouse operators have found that plant growth slows down at temperatures above 90°. It has also been found that plant growth is highest in the springtime when temperatures are moderate but becomes increasingly retarded as temperatures rise in the summertime. Consequently, for satisfactory growth, air cooling is necessary in the summertime in order to reduce the heat of the greenhouse atmosphere. Heat is also emitted from the special plant-growth-stimulating lamps now used by greenhouse operators in modern greenhouses which are constructed without windows so that the light can be accurately controlled, free from variation in natural light between winter and summer in greenhouses provided with windows.

BACKGROUND OF THE INVENTION

The present invention is an improvement on my previous U.S. Pat. No. 3,450,194 issued June 17, 1969 for Greenhouse Air-Cooling System, which required expensive excavation to provide the swimming-pool-like tank for producing in winter the ice used in cooling the greenhouse atmosphere in the summertime. Furthermore, the previous tank with its uninsulated walls below ground was subject to much more heat from the surrounding ground reaching and melting the stored ice in the tank, hence required a much larger tank than the present above-ground insulated tank.

Figure 1:
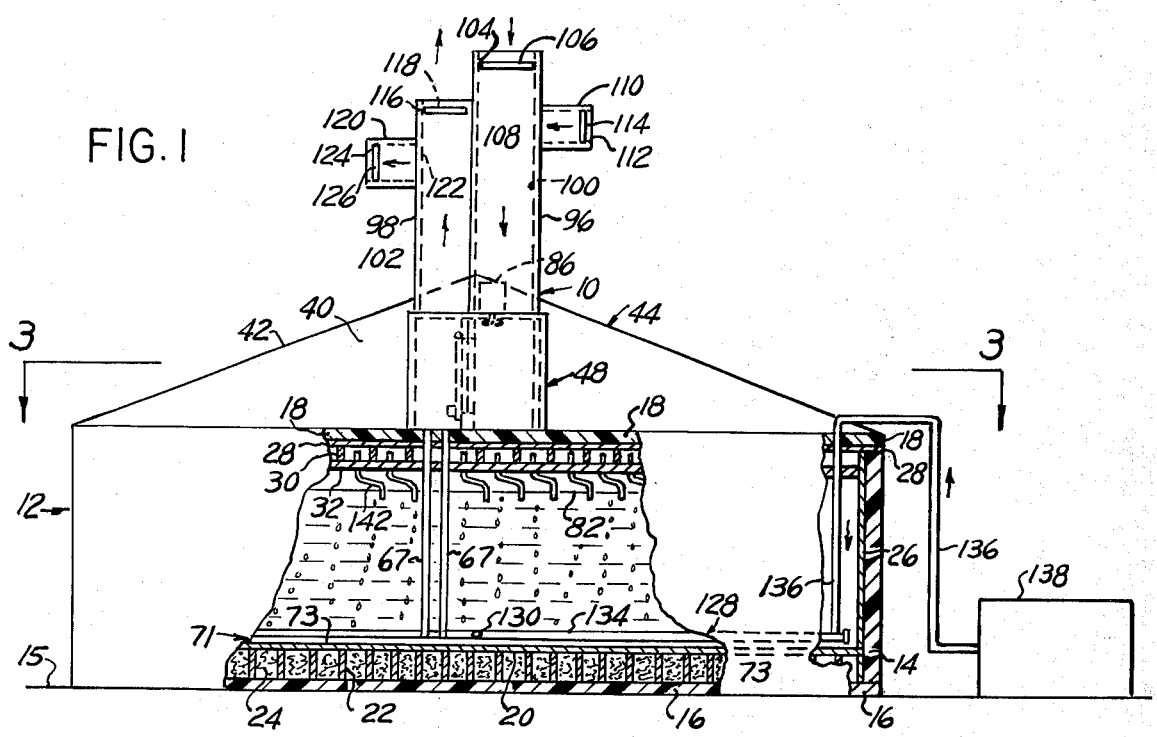
FIG. 1 is a side elevation of a greenhouse air-cooling apparatus, partly broken away to disclose the interior construction, looking in the direction of the arrows 1—1 in FIG. 3.
Figure 2:
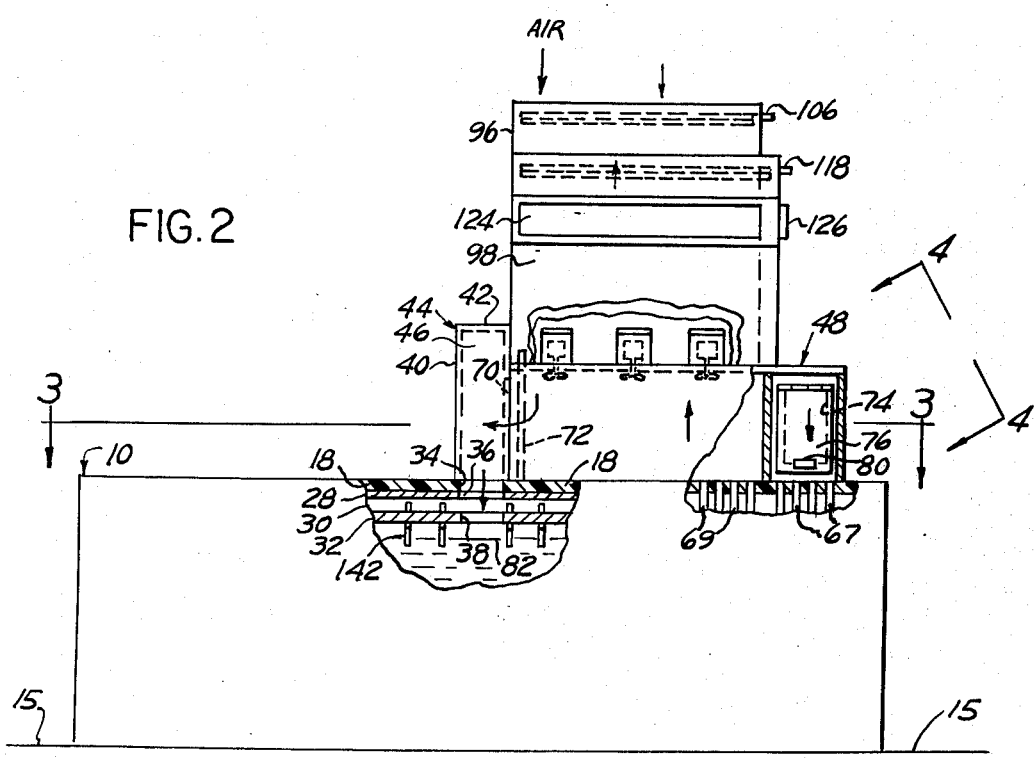
FIG. 2 is a side elevation, also partly broken away, of the greenhouse air-cooling apparatus shown in FIG. 1 at right angles thereto, looking in the direction of the arrows 2—2 in FIG. 3.
Figure 3:
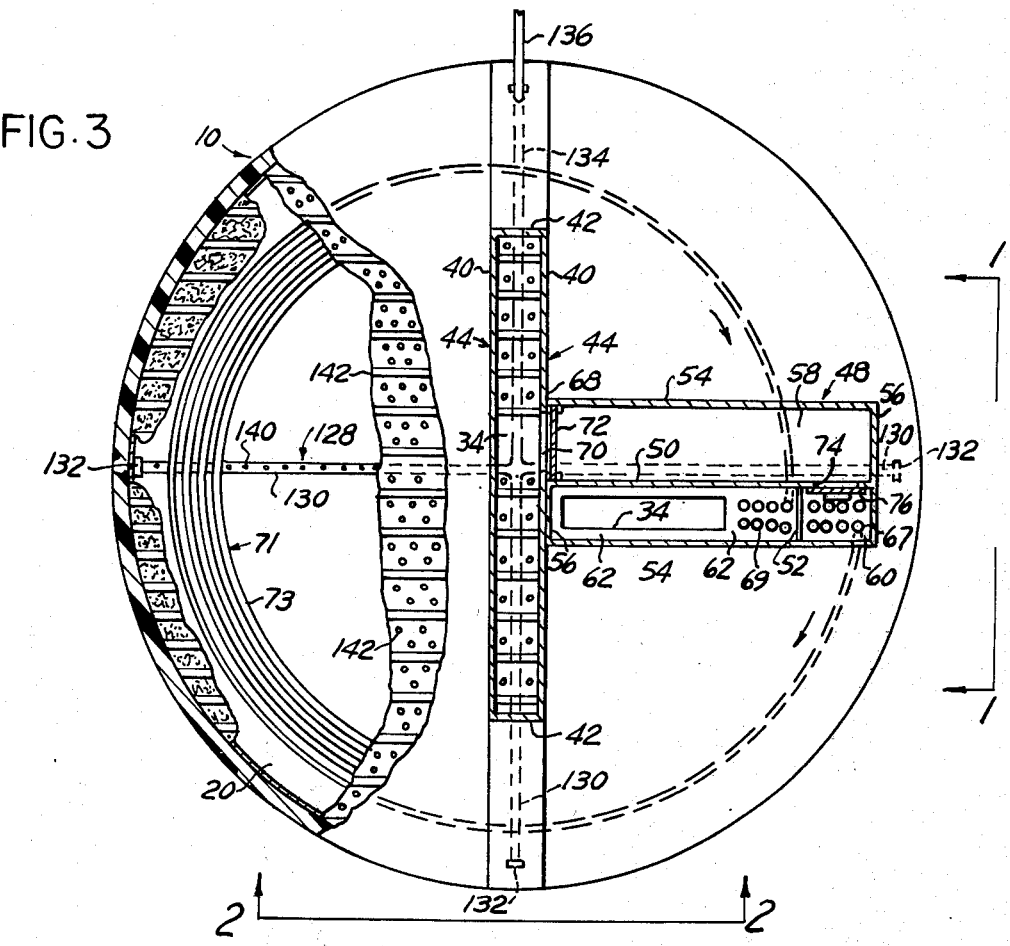
Figure 4:
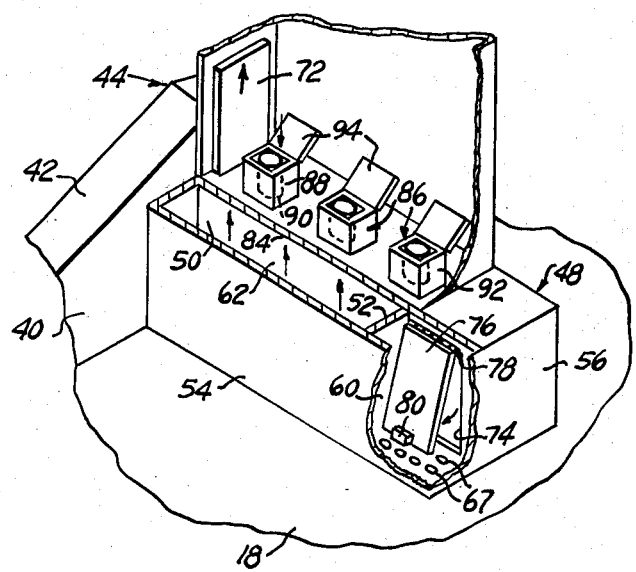

FIG. 3 is a top plan view of the apparatus, with the tank portion thereof partly broken away on three different levels in FIG. 1, and with the upper portion above the tank in section along the line 3—3 in FIG. 2; and FIG. 4 is a perspective view of the air control housing with multiple air chambers and air distribution blowers at the bottoms of the stacks of FIGS. 1 and 2, looking in the direction of the arrows 4—4 in FIG. 2.

Referring to the drawings in detail, FIGS. 1, 2 and 3 show the greenhouse air-cooling apparatus, generally designated 10, according to one form of the invention, as including a circular above-ground tank 12 having a side wall 14 rising from the ground level 15, a bottom wall 16 and a top wall 18. For low cost and low heat conductivity, these walls are preferably of plywood strengthened, if deemed necessary, by encircling steel cables (not shown). The interior of the tank 12 above the bottom wall 16 has a lower intermediate wall 20 (FIG. 1) supported in spaced parallel relationship to the bottom wall 16 upon horizontally-spaced parallel lower rafters 22 standing on edge, and with the spaces 24 therebetween filled with insulating material, such as polystyrene foam plastic known commercially as styrofoam. This foam plastic is waterproof, possesses good insulating properties, and can be made fire-resistant by the application of conventional fire-resistant coating material, well-known to those skilled in the plastic art. The side wall 14 is also insulated on the inner surface by a styrofoam insulating layer 26. A similar insulating layer 28 is applied beneath the top wall 18 to prevent undesired heat transmission therethrough.

The top wall 18 and its insulating layer 28 are supported upon horizontally-spaced parallel upper rafters 30 also standing on edge upon an upper intermediate wall 32. The top wall 18, insulating layer 28, and the upper intermediate wall 32 have aligned elongated central air-conducting openings 34, 36 and 38 respectively. Rising from the top wall 18 above the air-conducting openings 34, 36 and 38 are the parallel upstanding triangular side walls 40 and inclined end walls 42 of a gable-roof-shaped upper air duct 44 with an air chamber 46 therein. Also mounted on the top wall 18 and extending upward therefrom is a box-shaped air control housing 48 divided by intermediate partitions 50 and 52 (FIG. 3) respectively parallel to the side walls 54 and end walls 56 thereof to form air chambers 58, 60 and 62 respectively. The portion of the top wall 18 which forms the bottom of the air chamber 62 has an air opening 64 therein disposed directly over the upper rafters 30 and upper intermediate wall 32. The top wall 18 beneath the chambers 60 and 62 (FIG. 2) is drilled to receive the upper ends of multiple air supply and return pipes 67 and 69 respectively leading to the inlet and outlet ends of a set 71 of concentric copper pipe loops 73 resting on the lower intermediate wall 20. The inner end wall 56 at the inner end of the chamber 58 (FIG. 3) is provided with a vertical air opening 68 aligned with a vertical air opening 70 in the adjacent side wall 40 of the air duct 44 and adapted to be opened or closed by a vertically-sliding gate 72. The intermediate partition 50 is also provided with a vertical opening 74 adapted to be closed by a swinging damper 76 (FIG. 3) pivoted at 78 along its upper edge (FIG. 4) and weighted at 80 at its lower edge so as to normally close the opening 74 but adapted to open it on the arising of a sufficient pressure in the chamber 58 so as to permit air to flow downward through air supply pipes 67, thence through the pipe loops 73 and air return pipes 69 to the air chamber 62 (FIGS. 1 and 2). The pipe coils 73 constitute a greenhouse cooling heat exchanger.

Mounted on the top wall 84 of the air control housing 48 are several electric motor-driven blowers 86 equipped with aligned upper and lower air inlet and outlet openings 88 and 90 respectively in casings 92 (FIG. 4) for driving air downward through the openings 88 and 90 into the chamber 58 when the hinged covers 94 of the casings 92 are in their open positions (FIG. 4). Rising from the top wall 84 of the air control housing 48 are the air inlet and air outlet stacks 96 and 98 respectively containing air passages 100 and 102 respectively. The stack 96 terminates at its upper end in a top air opening 104 adapted to be opened or closed by a gate 106. The stack 96 immediately below the opening 104 is provided with a side stack opening 108 leading into a side branch duct 110, the outer end opening 112 of which is adapted to be opened or closed by a gate 114. Similarly, the stack 98 at its upper end has a top air opening 116 adapted to be opened or closed by a gate 118. Immediately below the top air opening 116 the stack 98 is provided with a side branch duct 120 leading from a side stack opening 122 to an outer end opening 124 adapted to be opened or closed by a gate 126.

Resting upon the circular pipe loops 71 (FIGS. 1 and 3) is a cross-shaped air discharge pipe 128 constituting a water-cooling heat exchanger and having three arms 130 provided with closed end caps 132 and a fourth arm 134 connected to an air supply pipe 136 (FIG. 1) which in turn is connected to a conventional portable motor-driven air compressor unit 138. The arms 130 and 134 on their upper sides are provided with spaced multiple air discharge holes 140 (FIG. 3) through which air can bubble upward through the water W in the tank 12 when supplied with air from the air compressor unit 138 through the air supply pipe 136. The upper intermediate wall 32 (FIG. 1) is drilled in a large number of locations to receive the upper ends of open-ended upper air discharge pipes 142 of flexible material such as elastomeric material and of unfolded Z-shaped configuration, in such a manner that their lower end portions and their intermediate portions can rise and fall relatively to their fixed upper end portions as ice forms adjacent the water level 82 as described below in connection with the operation of the invention.

In the operation of the greenhouse air-cooling apparatus, let it be assumed that winter has arrived and that the tank 12 has been filled with water to the water level 82 but that the water W has not yet been frozen and it is desired to do so. To prepare for such freezing, the operator opens the intake gate 114 in the branch duct 110 and closes the gate 106 in the top opening 104 in the air inlet stack 96. He then closes the gate 126 in the side branch duct 120 and opens the top gate 118 in opening 116. The gate 72 in the stack 54 is also raised to open the opening 70 (FIG. 3). The hinged covers 94 of the motor-driven blowers 86 are swung upward to open their intake openings 88 (FIG. 4). The blowers 86 and the motor-driven air-compressing unit 138 are then started in operation, whereupon compressed air flows through the air supply pipe 136 into the cross-shaped air discharge pipe 128, whence the air escapes through the multiple holes 140 and bubbles upward through the water W as shown in FIG. 1. At the same time, the air passing downward through the air inlet stack 96 by the action of the blowers 90 passes into the chamber 58 (FIG. 3). When the air pressure in the chamber 58 has risen to the point where it can overcome the opposing force of the weight 80 on the swinging damper 76, it pushes the latter open (FIG. 4) and allows air to pass through the chamber 60, thence downward through the multiple air supply pipes 67, whence it passes through the multiple circular pipe loops 71 and escapes upward through the multiple air return pipe 69 (FIGS. 2 and 3) into the chamber 62, whence it passes upward through the air outlet stack 98 and into the atmosphere through the top opening 116.

As a result of the foregoing actions, the compressed frigid winter air passing downward from the compressor 138 through the air inlet pipe 136 bubbles upward through the water W from the multiple holes 140 in the cross-shaped pipe 128. At the same time, frigid outside air passes downward from the blowers 86 into the chamber 58 and thence laterally through the opening 70 into the air chamber 46 within the upper air duct 44, whence it passes downward through the aligned openings 34, 36 and 38 into the space above the water level 82, whence it passes downward through the flexible Z-shaped pipes 142 beneath the water level 82, causing the top-most layer of water immediately adjacent the water level 82 to freeze. This action clogs the open lower end of the Z-shaped pipes 142 but permits the frigid outside air to bubble upward from the opening 140 in the cross-shaped pipe 128 so as to continue to freeze the water below the said topmost layer of water. The air, after passing through the water, escapes upward through the air discharge stack 98 and outward into the atmosphere through the opening 116 at the top thereof.

As is well known in physics, water when freezing, expands. To prevent possible rupture of the side walls 14 of the tank 12 by the lateral expansion of the ice in freezing, these side walls 14 may optionally be made frusto-conical in configuration rather than cylindrical. Thus, as the ice forms and expands upward, the outwardly flaring side walls would provide room for lateral expansion because of the upwardly widening space within the tank 12 provided by this frusto-conical configuration.

When, in the summertime, it is desired to cool the air in the greenhouse by means of the now solid ice in the space previously occupied by the water W, the operator closes the top gates 118 and 106 and opens the side gates 114 and 126, thus placing the side branch air inlet and outlet ducts 110 and 120 in communication with the interior of the greenhouse. The portable air compressor 138 is no longer needed and can be taken elsewhere for different utilization. One of the blowers 86 is caused to remain open by its hinged cover 94 being raised, while the covers 94 of the other two blowers 86 may be closed. The side gate 72 is now closed (FIGS. 3 and 4) so that the air from the greenhouse now passes downward through the chambers 100 and 58, the resulting pressure causing the damper 76 to swing open and permit the incoming air to pass downward through the air intake pipes 67, thence through the multiple loops 71 of copper metal and upward through the air return pipes 69, after having been cooled by the contact of the loops 71 with the now solid block of ice occupying the space previously occupied by the water W or subsequently by the ice-cold water beneath the ice. The air thus passing upward into the chamber 62 through the aligned openings 38, 36 and 34, as well as through the air return pipes 69, proceeds upward through the chamber 102 in the air outlet stack 98 and escapes into the greenhouse through the opening 124 in the side branch duct 120. A conventional temperature-responsive thermostatic switch (not shown) connected in circuit with the motor of the blower 86 starts and stops the motor-driven blower 86 in accordance with the temperature changes in the greenhouse.

I claim:

1. A greenhouse cooling apparatus, comprising
a cooling water tank disposed substantially entirely above ground level and including a base structure and a sidewall structure and a top wall structure,
a first water-cooling heat exchanger immersed in said tank below the intended water level thereof and having an air-conducting passageway therethrough with an air inlet and an air outlet therein,
a greenhouse-cooling heat exchanger also immersed in said tank below the intended water level thereof and also having an air-conducting passageway therethrough with an air inlet and an air outlet therein,
an air intake stack and an air outlet stack disposed in upstanding relationship to said tank and connected at their inner ends to said greenhouse-cooling heat exchanger inlet and outlet respectively.

power-driven air-moving means communicating with said air intake stack and with said first water-cooling heat exchanger for forcing cold winter air from the exterior of the greenhouse through said air intake stack and through said first water-cooling heat exchanger for freezing the water in said tank, and air flow control means for selectively directing warm air from the interior of the greenhouse by way of said air intake stack through said greenhouse-cooling heat exchanger and back through said outlet stack to the exterior of the greenhouse and alternatively for directing cold winter air from the exterior of the greenhouse by way of said air intake stack through said first water-cooling heat exchanger and back through said outlet stack to the exterior of the greenhouse.

2. A greenhouse-cooling apparatus, according to claim 1, wherein said first water-cooling heat exchanger is disposed below and adjacent the intended water level in said tank.

3. A greenhouse-cooling apparatus, according to claim 2, wherein said first water-cooling heat exchanger includes a multiplicity of horizontally-spaced cold-air-conducting conduits depending from said top wall structure and having open lower ends disposed below and adjacent said intended water level.

4. A greenhouse-cooling apparatus, according to claim 3, wherein said cold-air-conducting conduits are composed of flexible material and of approximately unfolded-Z-shaped configuration whereby their lower end portions can rise and fall in response to changing levels of ice in said tank.

5. A greenhouse-cooling apparatus, according to claim 1, wherein a second water-cooling heat exchanger is immersed in said tank below and remote from said first water-cooling heat exchanger and also receives cold winter air from said power-driven air-moving means.

6. A greenhouse-cooling apparatus, according to claim 5, wherein said power-driven air-moving means includes an auxiliary air compressor and also includes an auxiliary conduit extending from said auxiliary air compressor to said second water-cooling heat exchanger.

7. A greenhouse-cooling apparatus, according to claim 5, wherein said second water-cooling heat exchanger includes a multiplicity of horizontally-spaced cold-air-conducting discharge orifices therein.

8. A greenhouse-cooling apparatus, according to claim 5, wherein said air flow control means includes structure whereby each of said stacks has a side opening communicating with the interior of the greenhouse and a top opening communicating with the atmosphere outside the greenhouse, and wherein said air flow control means also includes valve means in each of said side and top openings for selective closing and opening thereof.

9. A greenhouse-cooling apparatus, according to claim 5, wherein an air chamber is disposed between the lower portion of said air intake stack and said greenhouse-cooling heat exchanger with an air opening therebetween, and wherein damper means is interposed over said air opening between said lower intake stack portion and said housing, said damper means being responsive to the attainment of a predetermined air pressure in said lower intake stack portion for uncovering said air opening.

10. A greenhouse-cooling apparatus, according to claim 3, wherein said top wall structure includes upper and lower vertically-spaced walls with a tank air chamber therebetween and with the upper ends of said cold-air-conducting conduits communicating with said tank air chamber, wherein a generally-horizontal air duct is disposed between said top wall structure and said air intake duct with an air opening therebetween, and wherein a selectively movable closure member is disposed adjacent said air opening in abutting relationship therewith for selectively establishing and terminating communication between said air intake stack and said air duct.

* * * * *